US007039947B1

(12) United States Patent
Indefrey et al.

(10) Patent No.: US 7,039,947 B1

(45) Date of Patent: May 2, 2006

(54) ERROR PROTECTED DATA TRANSFER SYSTEM AND METHOD

(75) Inventors: Klaus Indefrey, Nürnberg (DE); Werner Krämer, Schwandorf (DE); Bernhard Wiesgickl, Vilseck (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/647,170

(22) PCT Filed: Mar. 17, 1999

(86) PCT No.: PCT/DE99/00744

§ 371 (c)(1),
(2), (4) Date: Sep. 27, 2000

(87) PCT Pub. No.: WO99/50723

PCT Pub. Date: Oct. 7, 1999

(30) Foreign Application Priority Data

Mar. 30, 1998 (DE) ................................ 198 14 102

(51) Int. Cl.
*H04L 9/00* (2006.01)

(52) U.S. Cl. .......................... 726/3; 713/181; 713/154; 726/19; 726/4

(58) Field of Classification Search ................ 713/200, 713/201, 154, 181; 726/3, 419; 714/737; 708/423

See application file for complete search history.

(56) References Cited

U.S. PATENT DOCUMENTS

| | | | |
|---|---|---|---|
| 5,596,588 A * | 1/1997 | Nobutoki et al. | 714/748 |
| 5,673,389 A * | 9/1997 | Weber et al. | 714/55 |
| 6,466,539 B1 * | 10/2002 | Kramer et al. | 370/216 |

FOREIGN PATENT DOCUMENTS

| | | |
|---|---|---|
| DE | 3441227 | 9/1989 |
| DE | 4312305 | 10/1994 |
| DE | 4433013 | 3/1996 |
| DE | 19629868 | 2/1998 |
| EP | 0216372 | 8/1996 |
| EP | 0837394 | 4/1998 |

OTHER PUBLICATIONS

Hertel, Jurgen, "Absolut sicheres Geleit", 18 Messen & Pruefen Automatisieren 31 (1995) Oct., No. 10, Kaufering, DE.

* cited by examiner

*Primary Examiner*—Emmanuel L. Moise
*Assistant Examiner*—Paul Callahan
(74) *Attorney, Agent, or Firm*—Harness, Dickey & Pierce, P.L.C.

(57) ABSTRACT

Data transfer between a secure computer and a number of input/output units occurs via a bus control unit connected to the secure computer and a serial bus system. The bus control unit cyclically activates the input/output units connected to the bus system and transfers multi-bit message to the respective activated input/output unit. In order to produce a data transfer method which enables security/related signals to be transmitted via a non-error-protected bus system, at least one of the input/output units is designed as a security unit. Further, the multi-bit message transferred to the security unit has at least one checkbit. The security unit interprets the transferred multi-bit message as correct only if the checkbit alternates within a predefined monitoring period.

8 Claims, 3 Drawing Sheets

ERROR PROTECTED DATA TRANSFER SYSTEM AND METHOD

This application is the national phase under 35 U.S.C. § 371 of PCT International Application No. PCT/DE99/00744 which has an International filing date of Mar. 17, 1999, which designated the United States of America.

The present invention relates to a method for transferring data between a secure computer, e.g. a fail safe stored-program control, and a number of input/output units via a bus control unit connected to the secure computer and a serial bus system. The bus control unit cyclically activates the input/output units connected to the bus system and transfers a multi-bit message to the respective activated input/output unit.

A data transmission method of this type is known, e.g. by the name AS-i (=activator-sensor interface).

BACKGROUND OF THE INVENTION

In industrial automation engineering installations and machinery, hazardous conditions must be reliably identified and the controlled installation or machinery must be rendered secure in such an event. According to the state of the art, dedicated recording, cabling and evaluation systems are mostly used for the transmission of security-related signals of this type.

The use of dedicated recording, wiring and evaluation systems entails in particular high cabling cost, with the inherent risk of incorrect wiring. Efforts are therefore also made to transmit security-related signals via a bus system of this type. However, the security and reliability of the data transfer must not be adversely affected by a bus system of this type.

The security-related signals can be transmitted via a separate, error-protected bus system. However, this runs counter to the general tendency to minimize the wiring outlay.

DE 43 12 305 A1 discloses a method for transferring data between an error-protected stored-program control and a number of input/output units via a bus control unit connected to the stored-program control and a serial bus system. The bus control unit transfers messages to the input/output units connected to the bus system. In this data transfer method, at least one of the input/output units is designed as a security unit. Messages transferred to the security unit are transferred redundantly and are checked to ascertain whether or not they are identical. The transferred messages are interpreted as correct only if they are identical.

SUMMARY OF THE INVENTION

The object of the present invention is to provide a further data transmission method by means of which security-related signals can be transmitted via a non-error-protected bus system.

The object is achieved in a data transmission method of the aforementioned type in that at least one of the input/output units is designed as a security unit. The multi-bit message transferred to the security unit has a checkbite. The security unit interprets the transferred multi-bit message as correct only if the checkbit alternates within a predefined monitoring period.

An insecure condition is thus avoided—even in the case of non-redundant data transfer—not only if no further multi-bit messages are transferred, e.g. in the event of failure of the bus control unit, but also if errored multi-bit messages are transferred.

If the security unit is designed as an output unit for activating an output, it may, for example, have a timer. A the end of the monitoring period, the timer switches the output to a secure condition. The timer is reset with each transfer of a correct multi-bit message.

The data transmission method is even more secure if the security unit can be activated under two different addresses. A multi-bit message is, in each case, transferred to the security unit under both addresses and the security unit interprets the transferred multi-bit messages as correct only if the two multi-bit messages match one another.

The multi-bit message preferably comprises at least four data bits.

BRIEF DESCRIPTION OF THE DRAWINGS

Further advantages and individual features are presented in the following description of an embodiment, including the following diagrams.

DETAILED DESCRIPTION OF PREFERRED EMBODIMENTS

Figure 1:
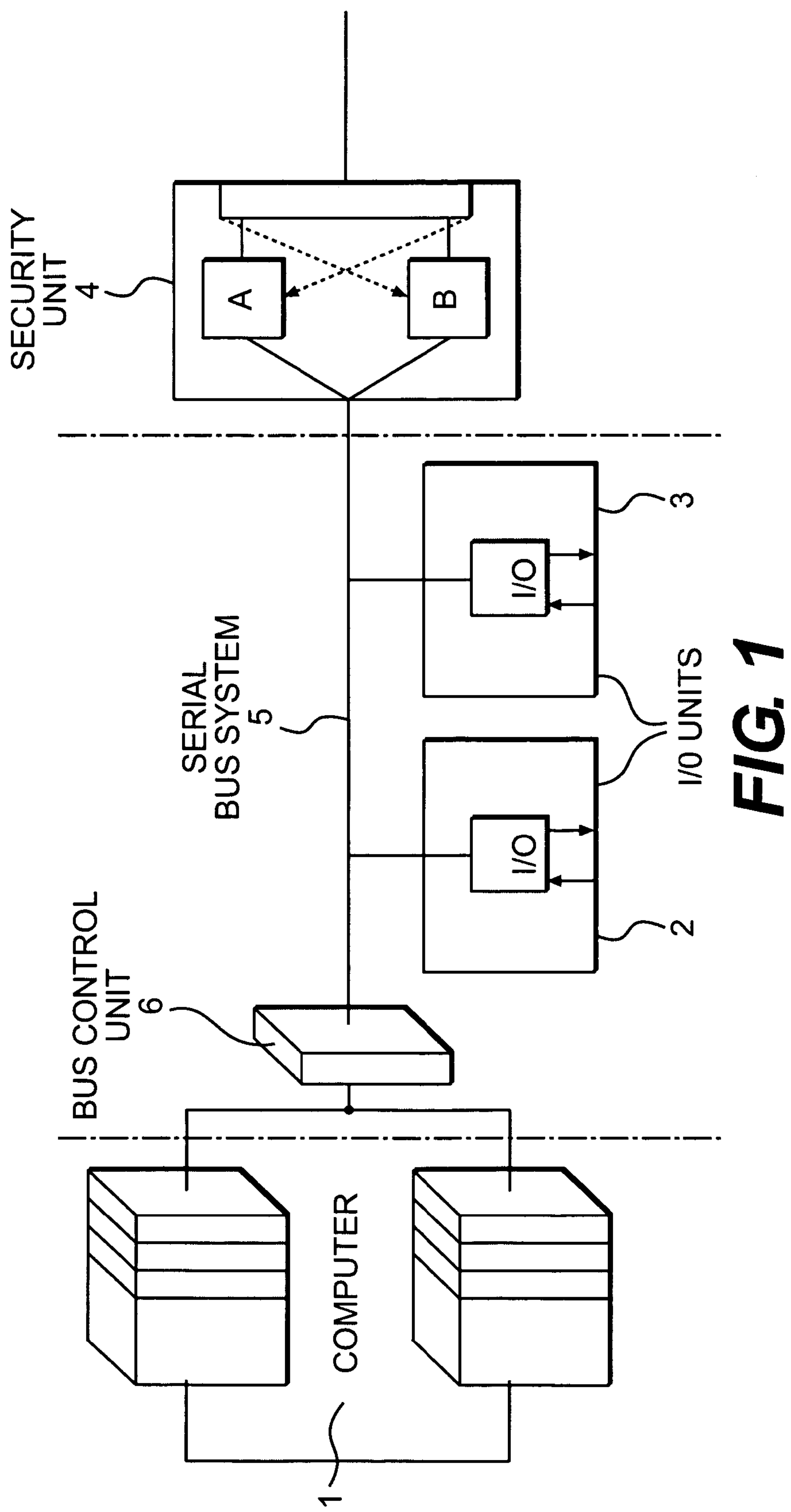
FIG. 1: a data transfer system.

According to FIG. 1, a data transmission system includes a secure computer 1 and a number of input/output units 2 to 4. The secure computer 1 is designed in the present case as a fail safe stored-program control. A stored-program control of this type is manufactured and sold, e.g. by Siemens AG under the designation SIMATIC S5-95F.

The input/output units 2, 3 are conventional input/output units, by means of which up to four binary signals can be processed per unit. The input/output unit 4 on the other hand is a security unit. It can process precisely one data element. However, the security unit 4 could essentially process more data elements. It is crucial that it processes at least one data element less than the data bits transferred to it. This redundant data bit can then be used to check the data transfer system.

The input/output units 2 to 4 are connected to a serial bus system 5. Furthermore, a bus control unit 6, which in turn is connected to the secure computer 1, is connected to the bus system 5. To transfer data between the secure computer 1 and the input/output units 2 to 4, the secure computer 1 activates the bus control unit 6. The latter successively activates the input/output unit 2 to 4 and transfers a multi-bit message 8 including at least four data bits to the relevant activated input/output unit 2 to 4.

Figure 2:
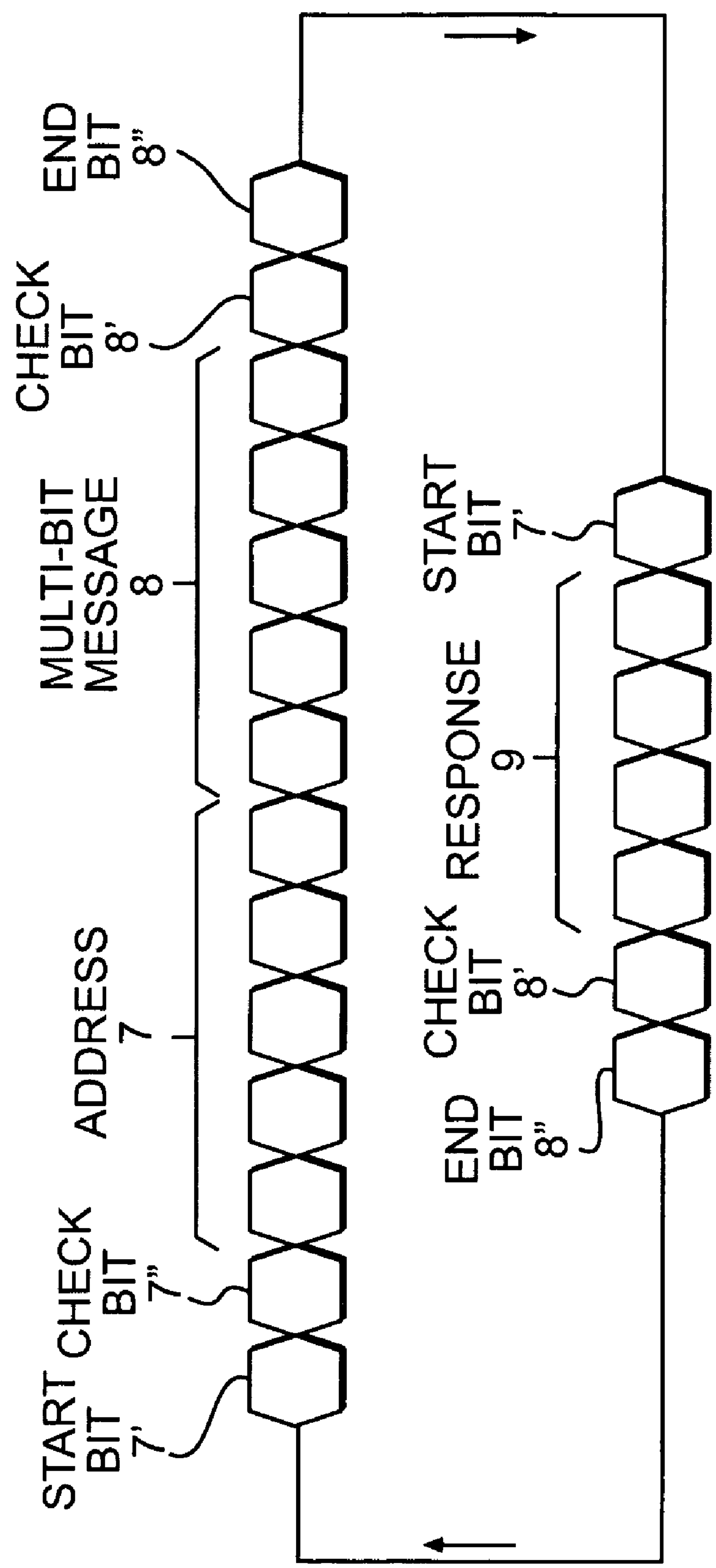
FIG. 2: a data transfer.

The format of a data transfer is shown in FIG. 2. According to FIG. 2, the bus control unit 6, following a start bit 7' and a checkbit 7", first sends an address 7 via the bus system 5 in order to activate one of the input/output units 2 to 4. It then sends the multi-bit message 8, which includes five data bits. The first data bit is a changeover bit, which is processed internally by the activated input/output unit 2 to 4. The second to fifth data bits are the actual data. The multi-bit message 8 is followed by a checkbit 8' and an end bit 8".

The activated input/output unit 2 to 4 sends a response 9, including four data bits, following a start bit 7'. The response 9 is again followed by a checkbit 8' and an end bit 8".

The address 7 is incremented by the bus control unit 6 after each data transfer, until all input/output units 2 to 4 are activated. Then the input/output units 2 to 4 having the lowest address is activated again, and the cycle restarts.

Figure 3:
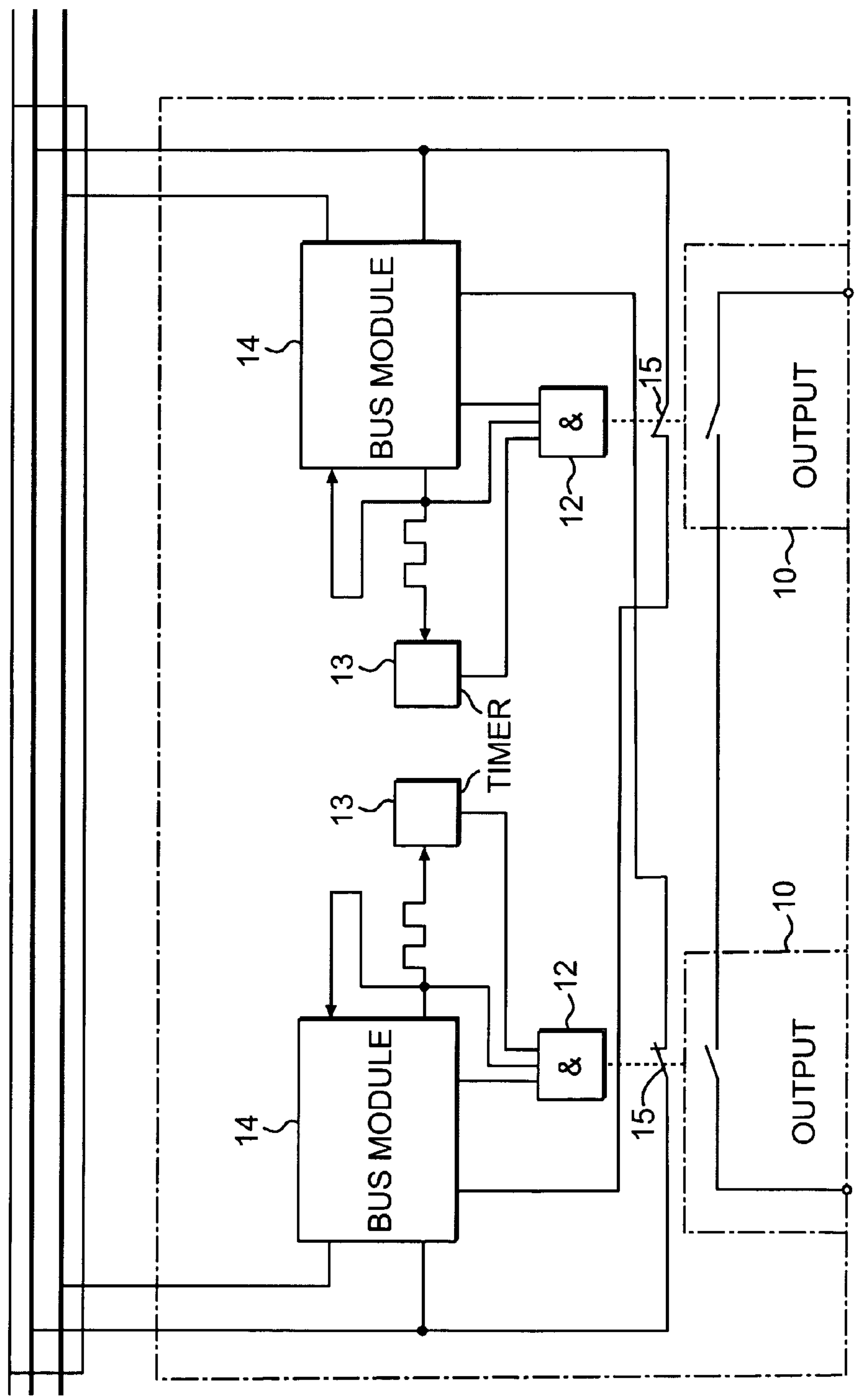
FIG. 3: a security unit.

According to FIG. 3, the security unit 4 is designed in the present case as an output unit for activating an output 10. Information indicating whether the output 10 should or should not be activated is therefore transferred by the bus control unit 6 to the security unit 4. The output 10 may be activated only if a secure condition of a controlled system or a controlled machinery exists. The controlled system or the controlled machinery must not therefore pose any danger. Otherwise, the output 10 must be switched immediately to the non-activated condition.

To determine the control signal for the output 10, the security unit 4 first evaluates the second data bit of the transferred multi-bit message 8. The output 10 will be activated only if the data bit has the value one. Otherwise, the output 10 is switched to the secure, non-activated condition.

The third and fourth data bits are insignificant for the security unit 4 in the present case. However, further outputs could be activated by them if necessary.

The fifth data bit of the multi-bit message 8 is a checkbit. It is fed to a timer 13. The timer 13 is in each case reset when the checkbit fed to it alternates in relation to the checkbit previously fed to it. If, however, the checkbit retains its value, the timer 13 will expire at the end of a predefined monitoring period. In this case, the timer 13 transfers a zero signal to an AND circuit 12, so that the output 10 is also switched in this case to the non-activated condition. In this case also, an insecure condition of the controlled system or controlled machinery is therefore avoided. The monitoring period is defined in such a way that, on the one hand, in the case of correct (cyclical) bus traffic, the timer 13 is always reset in good time before it expires. Further on the other hand, in the case of incorrect bus traffic, the output 10 is switched to the non-activated condition at the latest after a system-specific or machine-specific response time.

As is furthermore shown, the security unit 4 is designed in a redundant manner. It therefore has two bus modules 14, so that it can be activated under two different addresses. A separate multi-bit message 8 is; in each case, transferred to each of the bus modules 14 under its own address. Each of the bus modules 14 autonomously evaluates the multi-bit message 8 transferred to it and activates its AND circuit 12 accordingly.

The outputs 10 of the two bus modules 14 are connected in series. In the result, the transferred multi-bit messages 8 are therefore interpreted as correct only if they match one another. The security of the data transfer can be even further increased if the multi-bit messages 8 are transferred to the bus modules 14 inversely in relation to one another.

The bus modules 14 are reciprocally connected via switches 15. Each of the bus modules 14 therefore recognizes the switching condition of the respective other bus module 14. In their responses 9, the bus modules 14 can therefore feed not only their own switching condition, but also the switching condition of the respective other bus module 14, back to the secure computer 1. The security of the data transfer system is therefore even further increased.

A data transfer system with a single security unit 4, designed as an output unit for activating an output 10, has been described above. However, a plurality of security units can of course be connected to the bus system 5. The security units can also be designed as secure input units.

The invention claimed is:

1. A method for transmitting data between a fail safe computer and a plurality of input/output modules via a bus control unit, said bus control unit being connected to said plurality of input/output modules via a serial bus and being connected to the fail safe computer, comprising cyclically carrying out following steps:

transmitting, via the bus control unit, a first address over the serial bus for addressing one of the input/output modules;

transmitting, via the bus control unit, a first multi-bit message over the serial bus to the input/output module addressed by the first address, the first multi-bit message including at least one first check bit and at least one first load bit;

receiving, at the input/output module addressed by the first address, the first multi-bit message; and accepting, at the input/output module addressed by said first address, the first multi-bit message as correct only if the at least one first check bit is different from a corresponding first check bit included in a previous first multi-bit message received by the input/output module when addressed by the first address.

2. A method according to claim 1, wherein the addressed input/output module additionally executes, the steps of:

resetting a timer belonging to the addressed input/output module, if and only if said at least first one check bit is different from the corresponding first check bit included in the previous first multi-bit message received by this input/output module when addressed by the first address, switching an output of the addressed input/output module to a secure condition when said timer has run out; and determining a state of the output according to the at least one first load bit as long as the timer has not run out.

3. A method according to claim 1, further comprising the steps of:

transmitting, via the bus control unit, a second address over the serial bus for addressing the input/output module already addressed by the first address also by the second address;

transmitting, via the bus control unit, a second multi-bit message over the serial bus to the input/output module addressed by the second address, the second multi-bit message including at least one second check bit and at least one second load bit;

receiving, at the input/output module addressed by the second address, the second multi-bit message; and accepting, at the input/output module addressed by the second address, the second multi-bit message as correct only if the at least one second check bit is different from a corresponding second check bit included in a previous second multi-bit message transmitted to the input/output module when addressed by the second address.

4. A method according to claim 3, further comprising the steps of:

comparing, at the input/output module addressed by the first and second addresses, the first and second multi-bit messages; and accepting, at the input/output module addressed by the first and second addresses, the first and second multi-bit messages as correct only if said first and second multi-bit messages correspond to each other.

5. A method according to claim 4, wherein the number of first load bits is at least four.

6. A method according to claim 1, wherein the number of first load bits is at least four.

7. A method according to claim 3, wherein the number of first load bits is at least four.

8. A method according to claim 2, wherein the number of first load bits is at least four.

* * * * *